(12) United States Patent
Kroigaard

(10) Patent No.: US 6,497,602 B2
(45) Date of Patent: Dec. 24, 2002

(54) SHOCK ABSORBER FOR A TOY BUILDING ELEMENT

(75) Inventor: Olav Kroigaard, Bredsten (DK)

(73) Assignee: Interlego AG, Baar (CH)

( * ) Notice: Subject to any disclaimer, the term of this patent is extended or adjusted under 35 U.S.C. 154(b) by 0 days.

(21) Appl. No.: 09/838,445

(22) Filed: Apr. 19, 2001

(65) Prior Publication Data

US 2002/0019191 A1 Feb. 14, 2002

Related U.S. Application Data

(63) Continuation-in-part of application No. 09/416,280, filed on Oct. 12, 1999, now abandoned.

(30) Foreign Application Priority Data

Oct. 14, 1998 (DK) ............................................. 01310/98

(51) Int. Cl.[7] .............................................. A63H 27/00
(52) U.S. Cl. ............................ 446/88; 446/93; 446/469
(58) Field of Search ................................ 446/176, 465, 446/489, 85, 88, 93, 95; 267/34, 131, 64.12; 188/300

(56) References Cited

U.S. PATENT DOCUMENTS

| | | | | |
|---|---|---|---|---|
| 3,603,575 A | * | 9/1971 | Arlasky et al. ............... | 267/34 |
| 3,794,309 A | * | 2/1974 | Chrokey et al. ....... | 188/322.22 |
| 4,822,012 A | * | 4/1989 | Sketo ......................... | 267/150 |
| 5,056,764 A | * | 10/1991 | Mochizuki ............. | 188/321.11 |
| 5,309,861 A | * | 5/1994 | Mardikian .................. | 114/363 |
| 5,827,107 A | * | 10/1998 | Bears et al. ................ | 446/259 |

* cited by examiner

*Primary Examiner*—Jacob K. Ackun
*Assistant Examiner*—Faye Francis
(74) *Attorney, Agent, or Firm*—Pitney, Hardin, Kipp & Szuch LLP

(57) ABSTRACT

A shock absorber for use as a construction element of a toy building set, the shock absorber comprising a rod element provided with a collar at a first end and a mounting at a second end; a sleeve through which the rod element extends; an air-filled cylinder element abutting the sleeve and enclosing the collar; the air-filled cylinder element having a cylindrical inner surface which is so configured that the collar on the rod element is in displaceable abutment on the inner wall of the cylinder element; and a spring surrounding the rod element having one end in abutment on the rod element at the second end, and having an opposite end in abutment on the sleeve, whereby the spring presses the sleeve towards the air-filled cylinder element.

12 Claims, 3 Drawing Sheets

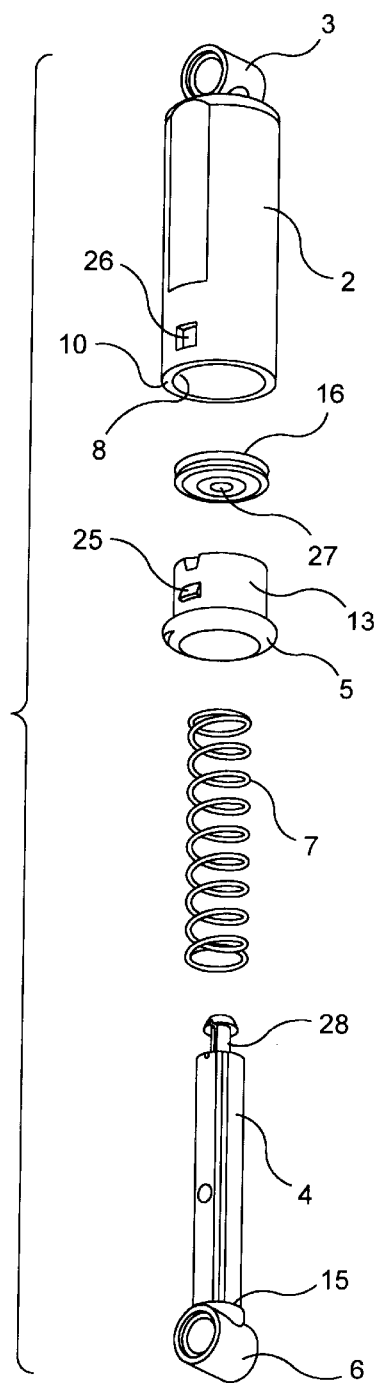
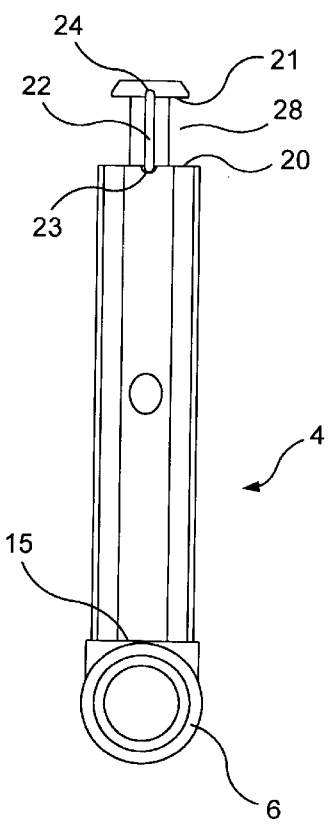
FIG. 2
FIG. 3

SHOCK ABSORBER FOR A TOY BUILDING ELEMENT

RELATED APPLICATION

This is a continuation-in-part of U.S. application Ser. No. 09/416,280, filed Oct. 12, 1999 now abandoned.

FIELD OF THE INVENTION

The present invention relates to toy building sets and in particular to a shock absorber for toy building sets, said shock absorber comprising a substantially rod-shaped element having at its one end a collar and a guide comprising a sleeve which displaceably encloses the rod-shaped element; and wherein the rod-shaped element and the guide each has means for mounting on another construction; and wherein a spring is arranged which, with its one end, abuts on the rod-shaped element and, with its other end, abuts on the sleeve in such a manner that it uses its spring force to displace the above-mentioned sleeve towards the collar on the first mounting element.

DESCRIPTION OF THE PRIOR ART

Such shock absorbers are often used in toy building sets for the construction of mechanical models, such as vehicles and the like, wherein the shock absorber can be arranged on movable elements of some kind of movable construction in such a manner that a springy movement is obtained. When the shock absorber is used, e.g., in the construction of a vehicle, the shock absorber can serve as a shock absorber for the movable wheel suspension of the vehicle whereby the model thus built will act approximately as a real vehicle.

U.S. Pat. No. 5,056,764 teaches, e.g., a shock absorber arranged in such a manner that it can easily be mounted on another construction in that the guide for the rod-shaped element in combination with the collar on the rod-shaped element make it easy to mount the shock absorber on another construction by shifting a slotted portion of the other construction in between the guide and the collar on the shock absorber.

However, it is a problem with this solution that, although adequate spring function can be obtained, only a limited shock absorption is obtained, since the absorbing effect is generated as a result of the friction between the rod-shaped element and the guide, and this friction has to be limited in such a manner that it is ensured that the shock absorber does not by itself, during use, become unstuck from the other construction on which it is mounted.

U.S. Pat. No. 4,869,704 teaches another configuration of a spring device for a toy building set whereby a substantially increased absorption effect is obtained in addition to the spring function in that a conical helical by itself triggers the springy as well as the shock absorbing effect, the individual coils of the conical helical spring being in frictional abutment on each other.

The shock absorbing and springy conical helical spring according to U.S. Pat. Nos. 5,056,764 and 4,869,704, respectively, are arranged in such a manner that the shock absorption and the spring effect are obtained simultaneously.

Moreover, e.g., U.S. Pat. Nos. 3,603,575 and 4,869,704 feature a plurality of embodiments of shock absorbers and shock absorbing elements, the construction of which being unsuitably for use in toys since they are, firstly, configured with a view to use of a hydraulic fluid to obtain the internal shock absorbing friction, and, secondly, their construction is relatively complex.

SUMMARY OF THE INVENTION

In light of this, it is the object of the present invention to provide a shock absorber for a toy building set of the type described in the introductory part whereby it is possible, on the one hand, by simple means to obtain a substantially increased shock absorbing effect.

According to the present invention, this is obtained with a shock absorber of the kind described in the introductory part in that the guide further comprises a substantially air-filled cylinder element with a substantially cylindrical inner wall which is so configured that the collar on the rod-shaped element is arranged in displaceable abutment on the inside of the cylinder element.

In an advantageous embodiment of the invention, the collar is configured as a piston, and the piston in elastic abutment on the inner wall of the air-filled cylinder element. Hereby a friction between the piston and the air-filled cylinder element is obtained which yields an adequate absorbing effect.

According to a further preferred embodiment, the means for mounting the rod-shaped part and the guide on another construction comprise respective eyes arranged on each of these whereby it is possible to mount in each of said eyes a shaft end or the like part on another construction.

The cylindrical inner wall on the air-filled cylinder element is particularly advantageously closed at its one end and open at its opposite end. Viz, hereby a shock absorbing effect is obtained when the collar is forcibly shifted in the air-filled cylinder element.

Particularly advantageously, the air-filled cylinder element has, at its open end, means for releasable coupling of the air-filled cylinder element and the sleeve. Viz, it is hereby obtained that the cylinder element and the sleeve with the displaceable rod-shaped element can readily be removed from each other.

According to an alternative preferred embodiment, the air-filled cylinder element and the sleeve are provided with means for snaplocking the sleeve to the air-filled cylinder element which means that the two elements cannot be pulled apart during normal use.

Further advantageously, that end of the rod-shaped element opposite the end where the collar is situated comprises a seat for receiving the one end of the spring, and where the other end of the spring abuts on a second seat arranged on the sleeve. Hereby the sleeve with the displaceable rod-shaped element and the spring can be removed from the cylinder element as an integral unit without the spring being dismounted.

In this context, the spring is particularly advantageously a helical spring which is so arranged as to substantially enclose the rod-shaped element.

The above-described separation of the shock absorber is further facilitated by a particularly advantageous embodiment of the invention wherein the means for releasably mounting the air-filled cylinder element on the sleeve is constituted by an abutment surface located at the open end on the air-filled cylinder element and a complementarily configured abutment surface located on said sleeve, and positioning means configured with a view to preventing sideways displacement of the air-filled cylinder element relative to the sleeve. Viz, it is hereby obtained that the cylinder element can be separated from the remaining part of the shock absorber simply by pulling the two elements apart.

Such authentic embodiment of the shock absorber is obtained provided the means for mounting of the rod-shaped element on another construction are arranged on the end of the rod-shaped element which is opposite that end on which the collar is arranged.

In this context, the sleeve is particularly advantageously provided with a through-going opening through which the rod-shaped element can be shifted; and in that the opening has an internal cross sectional dimension that exceeds the cross sectional dimension of the rod-shaped element, measured in the same direction, whereby the rod-shaped element can be shifted substantially without friction in the through-going opening in the sleeve.

Further advantageously, the means for releasable mounting of the guide on another construction are arranged on the cylinder element; and in that the cylinder element has a cylindrical inner wall which is air-tightly closed at the one end, and at the opposite end has an abutment surface for abutment on a corresponding abutment surface configured on the sleeve, whereby the cylinder element and the guide together from a cylindrical space in which the collar can be shifted, and wherein that end of the cylindrical space where the guide is arranged features ventilation passages with a view to ensuring a substantially unimpeded flow of air from the cylindrical space.

According to a preferred embodiment, the piston is configured as a disc in a rubber-elastic material, and said disc has a centrally arranged through-going opening, and the rod-shaped element has an annular recess at its one end, and wherein the disc is mounted on the rod-shaped element in that the annular recess extends through the central opening in the disc. Hereby it is obtained that it is extremely simple to mount that part of the shock absorber that comprises the rod-shaped element, the spring and the sleeve.

A particularly advantageous embodiment is obtained when the annular recess has a given width and when the disc has a thickness which is smaller than the width of the annular recess, whereby the disc is allowed to be displaced in the annular recess longitudinally of the rod-shaped element; and wherein the annular recess is delimited by a first abutment surface that restricts the displacement of the disc in a direction towards the one end of the rod-shaped element, and a second abutment surface that restricts the displacement of the disc in the opposite direction, and wherein each of the two abutment surfaces is provided with a groove that extends from the bottom of the annular recess and to the periphery of the recess on the rod-shaped element. This enables the groove to serve as a throttle passage for the air to be forced past the piston by displacement of the piston in the air-filled cylinder element, and it is hereby ensured by simple measures that an even shock absorbing effect is accomplished, also after a protracted period of use.

If the groove in the first abutment surface has a cross sectional area which is different from the corresponding cross sectional area on the second abutment surface, it is further accomplished that a different throttle area is provided which means that the absorbing effect is different, depending on whether the piston is withdrawn from or inserted into the air-filled cylinder element.

The groove in the first abutment surface can thus advantageously have a cross sectional area which is smaller than the corresponding cross sectional area on the second abutment surface, which means that the absorption peaks when the rod-shaped element with the piston is withdrawn from the air-filled cylinder element whereby the absorption completely or partially equalises the spring force so as to obtain that when a given force is exerted, substantially the same resistance to displacement of the piston in the air-filled cylinder element is accomplished.

BRIEF DESCRIPTION OF THE DRAWING

A preferred embodiment of the invention will now be described with reference to the drawings, wherein:

FIG. 2 is a blown-up, lateral view illustrating the shock absorber shown in FIG. 1;

FIG. 3 is a lateral view of a component of the shock absorber illustrated in FIG. 2.

DERAILED DESCRIPTION OF THE PREFERRED EMBODIMENTS

Figure 1:
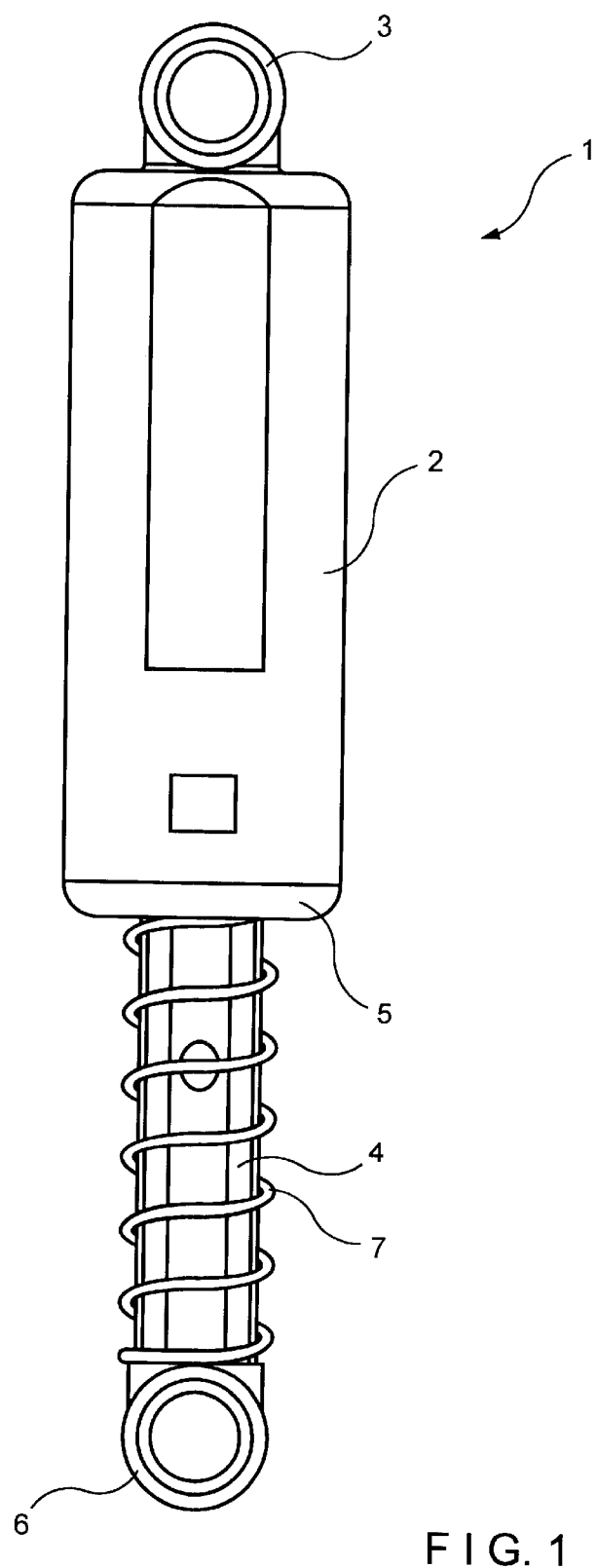
FIG. 1 is a lateral view illustrating a shock absorber according to the invention.

Thus, FIG. 1 is a view of a shock absorber 1 according to the present invention, seen in a lateral view. Thus the shock absorber 1 comprises a cylinder element 2 having at its one end an eye 3 for mounting of the shock absorber on another construction, such as a (not shown) shaft end or the like. Since, obviously, the shock absorber can, in this manner, be mounted on any other construction that features such shaft end for receiving the eye 3, this is not exemplified in the figures.

It will also appear from FIG. 1 that the shock absorber 1 has a rod-shaped element 4 which is displaceably arranged in a sleeve 5, and wherein the rod-shaped element 4 has, at the end facing away from said sleeve 5, an eye 6 corresponding in principle to the eye 3 on the cylinder element 2, whereby the eyes 3 and 6 can be mounted on shaft ends with substantially identical dimensions.

Around the rod-shaped element 4 a compression spring 7 is arranged that extends between the sleeve 5 and the eye 6 on the rod-shaped element 4, in such a manner that it aims at pressing the sleeve 5 along the rod-shaped element 4 and away from the eye 6 on the rod-shaped element 4.

As will appear, the shock absorber 1 can thus be mounted on another construction, e.g., between the wheel suspension and the body of a model vehicle whereby the shock absorber 1 will serve, and visually appear as a shock absorber therefor.

The construction of the shock absorber 1 shown in FIG. 1 will be discussed in further detail in the following with reference to FIG. 2 which is a blown-up view of the shock absorber shown in FIG. 1, seen from the side.

As will appear, the shock absorber comprises the sleeve 5 and the cylinder element, and it will appear that the cylinder element 2 has an inner wall which is configured as a circular-symmetrical cylinder surface 8 being at its one end, at the eye 3, closed and having at its other end an abutment surface 10 for abutment on a corresponding abutment surface on the sleeve 5.

Furthermore, the sleeve 5 has an elevation 13 arranged on the abutment surface which is complementary relative to the abutment surface 10 on the cylinder element 2. The elevation extends a distance into the cylinder element 2 which prevents the sleeve from being displaced sideways relative to the cylinder element 2, and on the elevation 13, studs 25 are arranged that are intended for engaging recesses 26 on the cylinder element during mounting of the sleeve 5 on the cylinder element, whereby the two elements are interlocked. Additionally, the sleeve has an opening which displaceably encloses the rod-shaped element 4 and forms a guide therefor. The opening is preferably configured to allow the rod-shaped element to be displaced therein substantially without friction.

Moreover, the sleeve 5 has an abutment surface for supporting the helical spring 7, and the rod-shaped element 4 extending within the helical spring 7 and having an abutment surface 15 at the eye 6, the spring will thus, following mounting of the shock absorber, extend between the eye 6 and the sleeve 5 and thereby press the sleeve 5 in a direction towards the piston 16, said piston 16 being mounted in the annular recess 28 on the rod-shaped element by means of a centrally arranged, through-going opening 27 in the piston 16.

Herein the piston 16 is made of a relatively elastic material which allows it to abut on the rotationally symmetrical cylinder surface 8 with a suitable friction.

It is thus found that the rod-shaped element 4 along with the piston 16 can be pressed into the cylinder element 2 and since, on the one side, the piston abuts on the rotationally symmetrical cylinder surface 8 on the cylinder element 2, and since the air that is enclosed in the cylinder element 2 on the top surface of the piston 16 is compressed and forced out at the periphery of the piston 16, adequate absorption effect is hereby accomplished.

Since friction occurs substantially exclusively between the piston 16 and the rotationally symmetrical cylinder surface 8, the sleeve 5 will effectively be maintained in abutment on the cylinder element 2 by the spring force of the spring 7, whereby the sleeve and the cylinder element serve as a permanently integral unit unless the entire piston 16 is completely withdrawn from the cylinder element 2.

This effect is further ensured in that the space delimited between the piston 16 and the sleeve is configured with passages for the discharge of the air that is compressed in this space when the rod-shaped element 4 is partially withdrawn from the cylinder element 2. In the embodiment shown, this passage is in the form of a free space between the rod-shaped element 4 and the opening 17.

Now, FIG. 3 will show the rod-shaped element 4 in an enlarged, lateral view, wherein said rod-shaped element is, in a preferred embodiment, provided with an annular recess 28 for receiving the disc-shaped piston 16 shown in FIG. 2. This recess is delimited by a first abutment surface 21 that prevents the not shown piston 16 from being displaced in a direction away from the eye 6, and a second abutment surface 20 that prevents the piston 16 from being displaced in a direction towards the eye 6 on the rod-shaped element 4.

In a preferred embodiment, the piston 16 is configured such that its thickness is less than the distance between the two abutment surfaces 20 and 21 that delimit the annular recess 28, which allows the piston 16 to be displaced a short distance forwards and backwards in the annular recess 28 whereby the piston, in its one position, abuts on the abutment surface 21 that is farthest from the eye 6 on the rod-shaped element 4 and, in its other position, is an abutment on the opposed abutment surface 20.

Viz, it is hereby possible in a simple manner to obtain a throttle effect in dependence on the position of the piston 16 in that a passage 22 is arranged at the bottom of the recess, said passage 22 being in communication with a first passage 24 situated in the one abutment surface 21, and a second passage 23 arranged in the opposed abutment surface 20, and in that the two passages 23,24 that are arranged in the abutment surfaces 20,21 have different cross sectional dimension, a throttling is accomplished of the air that flows through the passages 22,23,24, said throttling being dependent on the position of the piston 16.

If, in use, the piston 16 is thus withdrawn from the cylinder element 2, the passage 24 will constitute the smallest throttling cross section and when, in use, the piston 16 is moved in the opposite direction, it will be the passage 23 that constitutes the smallest throttling cross section, which means that the shock absorption performance differs depending on the direction of movement of the piston.

In this context, the passage 24 arranged on the abutment surface 21 which is farthest from the eye 6 preferably has the smallest flow cross section whereby a relatively high degree of shock absorption of the movement of the piston 16 out of the cylinder element 2 is accomplished, which means that the influence of the spring 7 is hereby balanced to a desired degree. obviously, the embodiment shown is exclusively an exemplary preferred embodiment of the present invention. However, the person skilled in the art will know how to realise other embodiments while using the same inventive principle. Thus, cylinder surfaces with different cross sectional dimensions can be used, such as square and other cross sections. As regards the location of the eyes 3,6, this may be varied as well without departing from the principle of the invention, and it is not a prerequisite that air has to be enclosed between the piston 16 and the cylinder element 2. Thus, passages can be arranged in that portion of the cylinder element 2 which is situated above the piston 16 or within the piston proper, whereby air is allowed to escape more readily when the piston 16 is pushed into the cylinder element 2. These degrees of freedom can be used with a view to adapting the shock absorbing performance of the shock absorber 1. Alternatively the friction between the piston 16 can be minimised and optionally completely eliminated if air is evacuated from the above-mentioned space above the piston 16 only at a certain resistance.

Figure 4:
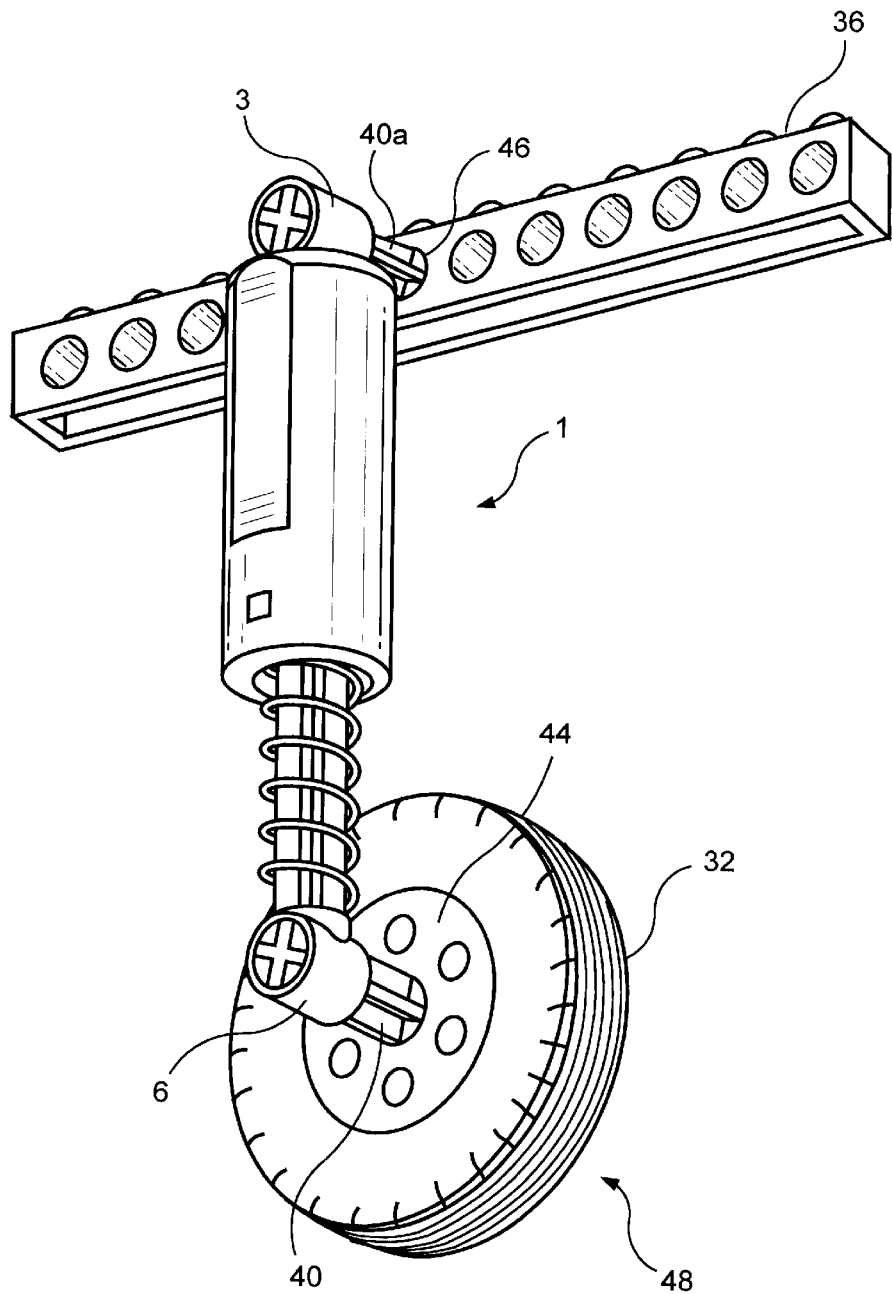
FIG. 4 is an isometric view illustrating a shock absorber shown in FIG. 1 connected to toy building elements.

Now, FIG. 4 will show the shock absorber 1 in an isometric view in a preferred embodiment, wherein said shock absorber 1 is provided in construction with other toy building set elements, specifically a wheel 32 and a longitudinal attachment component 36. FIG. 4 is illustrative of the connection of toy building elements; however, such connections are not limited to those toy building elements shown.

In the construction, wheel 32 attaches to shock absorber 1 by a cross-shaped shaft 40. One end of shaft 40 sizably conforms with hub 44 and another end sizably conforms with eye 6 of shock absorber 1. Attachment component 36 attaches to shock absorber 1 by shaft 40a. One end of shaft 40a sizably conforms with any one of recessed circular sections 46 of attachment component 36 and another end sizably conforms with eye 3. In operation, any surface force 48 encountered by wheel 32 will be minimized by shock absorber 1 before impacting attachment component 36.

Furthermore, it is obvious from a design point of view that there are ample options for the person skilled in the art to adapt the design to the relevant toy building set and the relevant purpose which makes it possible to provide a spring device with associated shock absorbing performance and that visually corresponds to actual machine components.

As regards materials, the embodiment shown is extremely suitable for manufacture in plastics, all components being so configured that core pullings are possible in an injection moulding process, and most components being to a very high degree rotationally symmetrical.

What is claimed is:

1. A shock absorber for use as a construction element of a toy building set, said shock absorber comprising a rod element provided with a collar at a first end thereof and means for mounting said rod element at a second opposite end thereof, a sleeve provided with a through-going opening through which the rod element extends; an air-filled cylinder element abutting said sleeve and enclosing said collar of said rod element, said air-filled cylinder element having a cylindrical inner surface closed at one end and open at an opposite end and so configured that the collar on the rod element is in displaceable abutment on the inner wall of the cylinder element, and having means for mounting said air-filled cylinder at an end thereof opposite said sleeve; and a spring surrounding the rod element having one end in abutment on the rod element at the second end thereof, and having an opposite end in abutment on the sleeve, whereby said spring presses said sleeve towards the air-filled cylinder element wherein the sleeve covers the open end of the air-filled cylinder element; and the open end of the air-filled cylinder element and the sleeve have complementary connecting means for releasably interconnecting said air-filled cylinder element and the sleeve.

2. A shock absorber according to claim 1, wherein the collar of the rod element is a piston that is in frictional abutment on the inner surface of the air-filled cylinder element.

3. A shock absorber according to claim 2, wherein the piston is configured as a disc of an elastic material, and said disc having a centrally arranged, through-going opening; and wherein the rod element has an annular recess arranged at its first end; and wherein the disc is mounted on the rod element by the annular recess extending through the central opening in the disc.

4. A shock absorber according to claim 3, wherein the annular recess has a given width; and wherein the disc has a thickness which is smaller than the width of the annular recess, whereby the disc is able to be displaced in the annular recess longitudinally of the rod element; and wherein the annular recess is delimited by a first abutment surface that restricts displacement of the disc in a direction toward one end of the rod element, and a second abutment surface that restricts displacement of the disc in an opposite direction; and wherein each of the two abutment surfaces is provided with a groove that extends from a bottom of the annular recess to an outer periphery of the recess on the rod element.

5. A shock absorber according to claim 4, wherein the groove in the first abutment surface has a cross sectional area which is different from a corresponding cross sectional area on the second abutment surface.

6. A shock absorber according to claim 4 wherein the groove in the first abutment surface has a cross sectional area which is smaller than a corresponding cross sectional area on the second abutment surface.

7. A shock absorber according to claim 1, wherein the mounting means comprises an eye arranged on the rod element and an eye on the air-filled cylinder element, respectively, each of said eyes comprising an opening extending transversely to a longitudinal axis of said rod element.

8. A shock absorber according to claim 1, wherein the second end of the rod element is provided with a seat for receiving one end of the spring; and wherein the opposite end of the spring is in abutment on another seat arranged on the sleeve.

9. A shock absorber according to claim 1, wherein the connecting means for releasably connecting the air-filled cylinder element with the sleeve are in the form of an abutment surface located at the open end of the air-filled cylinder element; and a complementarily configured abutment surface located on the sleeve; and positioning means that are configured with a view to preventing the air-filled cylinder element from being shifted sideways relative to the sleeve.

10. A shock absorber according to claim 9 wherein the air-filled cylinder element and the sleeve are provided with means for snap-locking the sleeve to the air-filled cylinder element.

11. A shock absorber according to claim 9, said through-going opening in the sleeve has an internal cross sectional dimension which exceeds a cross sectional dimension of the rod element, measured in the same direction, so that the rod element is displaceable without friction in the through-going opening of the sleeve.

12. A shock absorber according to claim 1, wherein the air-filled cylinder element has a cylindrical inner surface which is closed at one end, and at an opposite end has an abutment surface for abutment on a corresponding abutment surface arranged on the sleeve, whereby the air-filled cylinder element and the sleeve together form a cylindrical space in which the collar is displaceable; and wherein, at the end of the cylindrical space where the sleeve is located, ventilation passages are arranged with a view to ensuring a substantially unimpeded discharge of air from the cylindrical space.

* * * * *